(12) United States Patent
Suzuki et al.

(10) Patent No.: US 11,893,983 B2
(45) Date of Patent: Feb. 6, 2024

(54) ADDING WORDS TO A PREFIX TREE FOR IMPROVING SPEECH RECOGNITION

(71) Applicant: International Business Machines Corporation, Armonk, NY (US)

(72) Inventors: Masayuki Suzuki, Tokyo (JP); Gakuto Kurata, Tokyo (JP)

(73) Assignee: International Business Machines Corporation, Armonk, NY (US)

( * ) Notice: Subject to any disclaimer, the term of this patent is extended or adjusted under 35 U.S.C. 154(b) by 458 days.

(21) Appl. No.: 17/304,576

(22) Filed: Jun. 23, 2021

(65) Prior Publication Data

US 2022/0415315 A1 Dec. 29, 2022

(51) Int. Cl.
| | | |
|---|---|---|
| *G10L 15/197* | (2013.01) | |
| *G10L 15/22* | (2006.01) | |
| *G06F 40/279* | (2020.01) | |
| *G10L 15/16* | (2006.01) | |
| *G10L 15/30* | (2013.01) | |
| *G10L 15/06* | (2013.01) | |
| *G06N 3/044* | (2023.01) | |

(52) U.S. Cl.
CPC .......... *G10L 15/197* (2013.01); *G06F 40/279* (2020.01); *G10L 15/22* (2013.01); *G06N 3/044* (2023.01); *G10L 15/063* (2013.01); *G10L 15/16* (2013.01); *G10L 15/30* (2013.01)

(58) Field of Classification Search
CPC ..... G10L 15/197; G10L 15/22; G10L 15/063; G10L 15/16; G10L 15/30; G10L 15/08; G06F 40/279; G06N 3/044; G06N 3/09

USPC .......................................................... 704/235
See application file for complete search history.

(56) References Cited

U.S. PATENT DOCUMENTS

| | | | | |
|---|---|---|---|---|
| 4,783,803 A | | 11/1988 | Baker | |
| 5,758,024 A | * | 5/1998 | Alleva | ................... G10L 15/187 |
| | | | | 704/E15.02 |
| 6,076,056 A | * | 6/2000 | Huang | ..................... G10L 15/05 |
| | | | | 704/254 |
| 6,374,219 B1 | * | 4/2002 | Jiang | ....................... G10L 15/08 |
| | | | | 704/254 |

(Continued)

OTHER PUBLICATIONS

Bulusheva et al., "An Efficient Method for Vocabulary Addition to WFST Graphs", © Springer International Publishing Switzerland 2016, P. Sojka et al. (Eds.): TSD 2016, LNAI 9924, 2016, 7 pages.

(Continued)

*Primary Examiner* — Thuykhanh Le
(74) *Attorney, Agent, or Firm* — Stephen R. Yoder

(57) ABSTRACT

An approach for improving speech recognition is provided. A processor receives a new word to add to a prefix tree. A processor determines a bonus score for a first transition from a first node to a second node in a prefix tree on condition that the first transition is included in a path of at least one transition representing the new word. A processor determines a hypothesis score for a hypothesis that corresponds to a speech sequence based on the prefix tree, where the hypothesis score adds the bonus score to an initial hypothesis score to determine the hypothesis score. In response to a determination that the hypothesis score exceeds a threshold value, a processor generates an output text sequence for the speech sequence based on the hypothesis.

20 Claims, 11 Drawing Sheets

(56) References Cited

U.S. PATENT DOCUMENTS

| | | | |
|---|---|---|---|
| 6,539,353 B1* | 3/2003 | Jiang | G10L 15/142 704/254 |
| 6,571,210 B2* | 5/2003 | Hon | G10L 15/08 704/256.1 |
| 6,904,402 B1* | 6/2005 | Wang | G06F 40/253 704/10 |
| 7,020,587 B1* | 3/2006 | Di | G10L 15/285 703/2 |
| 7,649,478 B1* | 1/2010 | Yoon | H03M 11/08 341/67 |
| 8,179,370 B1* | 5/2012 | Yamasani | G06F 3/0237 345/169 |
| 8,676,815 B2* | 3/2014 | Deng | G06F 16/285 707/749 |
| 8,914,286 B1* | 12/2014 | Secker-Walker | G10L 15/083 704/235 |
| 9,043,197 B1* | 5/2015 | Pasca | G06F 40/284 704/10 |
| 9,269,355 B1* | 2/2016 | Secker-Walker | G10L 15/30 |
| 9,563,348 B2* | 2/2017 | Medlock | G06F 40/274 |
| 9,721,573 B2 | 8/2017 | Fritsch | |
| 9,761,227 B1* | 9/2017 | Quillen | G10L 15/32 |
| 10,049,668 B2* | 8/2018 | Huang | G10L 15/285 |
| 10,402,491 B2* | 9/2019 | Hosabettu | G06F 40/242 |
| 10,990,767 B1* | 4/2021 | Smathers | G06F 16/322 |
| 11,145,296 B1* | 10/2021 | Gandhe | G10L 15/22 |
| 11,211,058 B1* | 12/2021 | Eakin | G10L 15/197 |
| 11,227,114 B1* | 1/2022 | Yurtsev | G06F 16/3322 |
| 11,328,731 B2* | 5/2022 | Wang | G10L 15/26 |
| 2005/0055200 A1* | 3/2005 | Park | G06F 40/268 704/4 |
| 2007/0179784 A1* | 8/2007 | Thambiratnam | G10L 15/26 704/E15.045 |
| 2007/0299802 A1* | 12/2007 | Kwok | G06N 7/02 706/59 |
| 2008/0147381 A1* | 6/2008 | Yu | G06F 40/268 704/255 |
| 2008/0221896 A1* | 9/2008 | Cai | G10L 15/01 704/E15.021 |
| 2008/0243745 A1* | 10/2008 | Kwok | G06N 7/02 706/46 |
| 2009/0112863 A1* | 4/2009 | Lee | G06F 16/24568 |
| 2009/0125514 A1* | 5/2009 | Brown | G16B 30/00 707/E17.106 |
| 2010/0076761 A1* | 3/2010 | Juergen | G10L 19/0018 704/235 |
| 2014/0255931 A1* | 9/2014 | Porreca | C12Q 1/6869 435/6.11 |
| 2014/0281943 A1* | 9/2014 | Prilepov | G06F 40/232 715/257 |
| 2015/0170649 A1* | 6/2015 | Ashikawa | G10L 15/22 704/235 |
| 2015/0347381 A1* | 12/2015 | Bellegarda | G06F 40/274 704/9 |
| 2016/0012020 A1* | 1/2016 | George | G06F 40/30 704/9 |
| 2016/0267902 A1* | 9/2016 | Hwang | G06F 40/253 |
| 2017/0118336 A1* | 4/2017 | Tapuhi | G06F 16/3329 |
| 2017/0154030 A1* | 6/2017 | Moorjani | G06F 3/167 |
| 2018/0075084 A1* | 3/2018 | Hunicken | G06F 17/18 |
| 2018/0101599 A1* | 4/2018 | Arnold | G06F 40/274 |
| 2018/0173695 A1* | 6/2018 | Pino | G06F 40/44 |
| 2020/0135175 A1* | 4/2020 | Katz | G10L 15/30 |
| 2020/0159846 A1* | 5/2020 | Dixit | G06F 16/2246 |
| 2020/0251096 A1* | 8/2020 | Audhkhasi | G10L 15/16 |
| 2020/0302118 A1* | 9/2020 | Cheng | G06F 40/295 |
| 2020/0327881 A1* | 10/2020 | Kurata | G10L 15/16 |
| 2020/0357388 A1* | 11/2020 | Zhao | G10L 15/183 |
| 2021/0082437 A1* | 3/2021 | Thomas | G10L 15/32 |
| 2021/0126881 A1* | 4/2021 | Ball | G06F 40/216 |
| 2021/0192134 A1* | 6/2021 | Yue | G06F 16/3326 |
| 2021/0319796 A1* | 10/2021 | Wang | G10L 15/183 |
| 2021/0375270 A1* | 12/2021 | Weng | G10L 15/22 |
| 2022/0013126 A1* | 1/2022 | Haynor | G10L 15/183 |
| 2023/0076658 A1* | 3/2023 | Li | G10L 15/1815 |

OTHER PUBLICATIONS

Disclosed Anonymously, "Method and System for Recognizing Out-of-Vocabulary (OOV) Words using Spell and Recognize Acoustics-to-Word (A2W) Model", An IP.com Prior Art Database Technical Disclosure, IP.com No. IPCOM000253078D, IP.com Electronic Publication Date: Mar. 2, 2018, 3 pages.

Ee et al., "Improvements of A-based search algorithm in LVCSR engine Julius", Graduate School of Informatics, Kyoto University, 1999, 7 pages.

Odell et al., "A One Pass Decoder Design For Large Vocabulary Recognition", Cambridge University Engineering Department Trumpington Street, Cambridge, CB2 1PZ, England, printed on Apr. 30, 2021, 6 pages.

Sameti et al., "A large vocabulary continuous speech recognition system for Persian language", EURASIP Journal on Audio, Speech, and Music Processing 2011, 12 pages.

Saon et al., "Alignment-Length Synchronous Decoding for RNN Transducer", © 2020 IEEE, ICASSP 2020, 5 pages.

* cited by examiner $$(\text{ROOT}) \longrightarrow \text{``o''} \longrightarrow \text{``o''} \longrightarrow \overset{+\text{BONUS}}{\text{``v''}} \longrightarrow (\text{ROOT})$$

*FIG. 4A*

$$(\text{ROOT}) \longrightarrow \text{``o''} \longrightarrow \text{``o''} \xrightarrow{\text{+BONUS}} \text{``v''} \longrightarrow (\text{ROOT})$$

FIG. 4B

|  | +BONUS | −BONUS | | |
|---|---|---|---|---|
| CASE 1 | (ROOT) → "o" → "f" → (ROOT) | | | |

CASE 1   (ROOT) —+BONUS→ "o" —−BONUS→ "f" —→ (ROOT)

CASE 2   (ROOT) —+BONUS→ "o" —−BONUS→ "i" —→ "l" —→ (ROOT)

CASE 3   (ROOT) —+BONUS→ "o" —→ "o" —−BONUS→ "h" —→ (ROOT)

CASE 4   (ROOT) —+BONUS→ "o" —→ "o" —→ "v" —→ (ROOT)

*FIG. 4C*

CASE 1  (ROOT) —+BONUS→ "o" —−BONUS→ "f" ⟶ (ROOT)

CASE 2  (ROOT) —+BONUS→ "o" —−BONUS→ "i" ⟶ "l" ⟶ (ROOT)

CASE 3  (ROOT) —+BONUS→ "o" —+BONUS→ "o" —−2BONUS→ "h" ⟶ (ROOT)

CASE 4  (ROOT) —+BONUS→ "o" —+BONUS→ "o" —+BONUS→ "v" ⟶ (ROOT)

*FIG. 4D*

```
#01: Initialize beam = [ [hypothesis=[], score=0] ]
#02: For time t {
#03:    For each beam b {
#04:       Get transducer scores at t          # e.g. (a:0.2, b:0.3, c:0.1, ...)
#05:       For possible next characters c {    # Use prefix tree and hypothesis of the beam
#06:                                           # to determine possible next characters of b.
#07:          Append new beam (append c to the hypothesis of b,
#08:                           and add transducer score of c to the score of b)
#09:          Add bonus score or cancel bonus score for the new beam
#10:       }
#11:    }
#12:    Keep N beams with the highest score
#13: }
#14: Return hypothesis with the highest score in beam
```

*FIG. 6*

ADDING WORDS TO A PREFIX TREE FOR IMPROVING SPEECH RECOGNITION

BACKGROUND OF THE INVENTION

The present invention relates generally to the field of speech recognition, and more particularly to adding words to a prefix tree for speech recognition that recommends a speech recognition model to use the added words.

A speech recognition model, such as an end-to-end STT (Speech to Text) model, outputs a sequence of characters or sub-words from extracted features that represent spoken words by a person. Some speech recognition models utilize prefix trees that represent various words within a tree data structure. Each node of the prefix tree represents a character or subword of the words represented by the prefix tree.

SUMMARY

Embodiments of the present invention provide for a computer implemented method, computer program product and computer system to improve speech recognition. A processor receives a new word to add to a prefix tree. A processor determines a bonus score for a first transition from a first node to a second node in a prefix tree on condition that the first transition is included in a path of at least one transition representing the new word. A processor determines a hypothesis score for a hypothesis that corresponds to a speech sequence based on the prefix tree, where the hypothesis score adds the bonus score to an initial hypothesis score to determine the hypothesis score. In response to a determination that the hypothesis score exceeds a threshold value, a processor generates an output text sequence for the speech sequence based on the hypothesis.

BRIEF DESCRIPTION OF THE SEVERAL VIEWS OF THE DRAWINGS

FIG. 4A shows a first example of assigning a bonus score in the prefix tree according to an embodiment of the present invention.

FIG. 4B shows a second example of assigning a bonus score in the prefix tree according to an embodiment of the present invention.

FIG. 4C shows a third example of assigning and canceling a bonus score in the prefix tree according to an embodiment of the present invention.

FIG. 4D shows a fourth example of assigning and canceling a bonus score in the prefix tree according to an embodiment of the present invention.

FIG. 6 shows an algorithm for recognizing a speech according to an embodiment of the present invention.

DETAILED DESCRIPTION

Hereinafter, example embodiments of the present invention will be described. The example embodiments shall not limit the invention according to the claims, and the combinations of features described in the embodiments are not necessarily essential to the invention.

Figure 1:
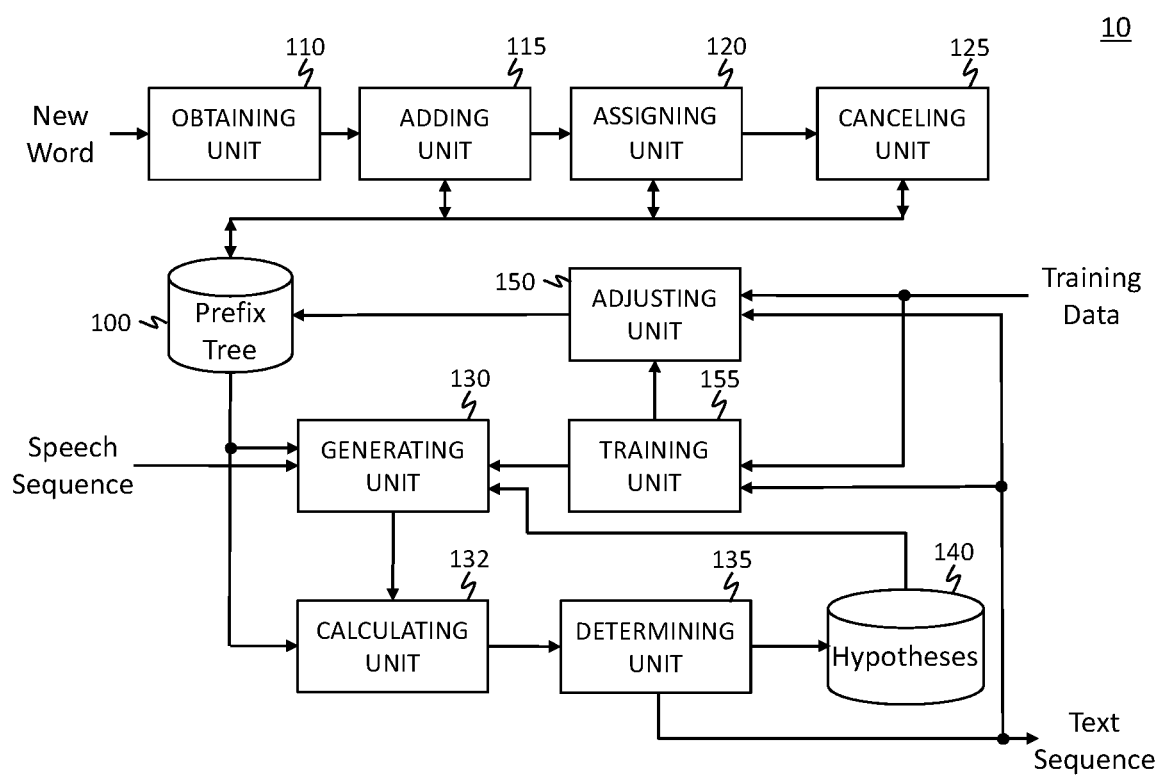
FIG. 1 shows a speech recognition apparatus according to an embodiment of the present invention.

FIG. 1 shows a speech recognition apparatus 10 according to an embodiment of the present invention. The speech recognition apparatus 10 may be a personal computer or a client computer such as a desktop computer, a portable computer, a tablet computer, or a smartphone. The speech recognition apparatus 10 may also be a server computer or a host computer such as a business server, an engineering server, or a mainframe computer. The speech recognition apparatus 10 may also be a computer system comprising two or more computers. In another embodiment, the speech recognition apparatus 10 may be a dedicated computer or dedicated hardware that includes a dedicated circuit for speech recognition.

In various embodiments, speech recognition apparatus 10 is an end-to-end STT system that receives as input a speech sequence and transforms the speech into a text sequence. The speech sequence may be a sequence of audio signals of a speech or a conversation obtained by one or more microphones. In various embodiments, the speech sequence is a sequence of input vectors that are converted (preprocessed) from a sequence of audio signals. Each input vector represents a feature of phonetics in a time interval assigned to the input vector. For example, the feature of phonetics is an MFC (Mel-Frequency Cepstrum) coefficient of phonetics. The output sequence is a sequence of symbols such as characters or sub-words. In various embodiments, the output sequence is a sequence of characters that represent, textually, the words spoken during the speech.

The speech recognition apparatus 10 includes prefix tree 100, an obtaining unit 110, an adding unit 115, an assigning unit 120, a canceling unit 125, a generating unit 130, a calculating unit 132, a determining unit 135, and hypotheses 140. The storage stores a prefix tree 100. Prefix tree 100 represents various words with a tree data structure. In various embodiments, the speech recognition apparatus 10 outputs a sequence of words based on analysis of prefix tree 100. In other words, each word in the output sequence is comprised of nodes in prefix tree 100. Prefix tree 100 registers each word as a path that includes at least one transition through at least one node from a root node to a leaf node in the tree data structure. Prefix tree 100 is explained later in more detail with reference to FIG. 2.

The obtaining unit 110 obtains one or more new words that are not included in the prefix tree. In this specification, "new word(s)" is at least one word that is not registered in the prefix tree or a word that is registered in the prefix tree after training a speech recognition model in the generating unit 130. The obtaining unit 110 may include an input interface connected to an input device such as a keyboard and may receive one or more new words input by a user. In another implementation, the obtaining unit 110 may receive a list of new words through a network or read a list of new words stored in a storage.

The adding unit 115 is connected to the obtaining unit 110. The adding unit 115 receives the new word (i.e., each new word) from the obtaining unit 110. The adding unit 115 adds (or inserts) the new word to prefix tree 100. In more detail, the adding unit 115 adds a path of at least one transition representing the new word in prefix tree 100.

The assigning unit 120 is connected to the adding unit 115. The assigning unit 120 receives the new word added in prefix tree 100. The assigning unit 120 assigns a bonus score to a first transition from a first node to a second node in prefix tree 100 on the condition that the first transition is included in the path of at least one transition representing the new word. The assigning unit 120 records the bonus score in association with the first transition stored in prefix tree 100.

The canceling unit 125 is connected to the assigning unit 120. The speech recognition apparatus 10 may include the canceling unit 125 in a configuration that the assigning unit 120 assigns the bonus score to a first transition that may be shared by other vocabulary words that do not require the bonus score. In another embodiment, the speech recognition apparatus 10 may not include the canceling unit 125. The canceling unit 125 receives the new word added in the prefix tree. The canceling unit 125 cancels the bonus score at a second transition, which is located downstream (i.e., closer to leaf node) of the first transition in prefix tree 100 if the second transition is not included in at least one transition representing the new word. In various embodiments, canceling unit 125 records a negative bonus score in association with the first transition stored in the prefix tree 100.

The generating unit 130 is connected to the prefix tree 100. The generating unit 130 receives the speech sequence and generates one or more hypotheses. In more detail, the generating unit 130 obtains one or more new hypotheses by adding, for each current hypothesis stored in the hypotheses 140, one or more next symbols such as a character or a sub-word estimated to appear next in the speech. The generating unit 130 may include a transducer such as an RNN (Recurrent Neural Network) transducer. The generating unit 130 may use the transducer to predict one or more next symbols to be added to each hypothesis.

The generating unit 130 may also calculate a base score of each new hypothesis by adding a score of the next symbol to the base score of the current hypothesis, or initial hypothesis score. The score of the next symbol is higher if the probability of the next symbol estimated by the transducer is higher.

The calculating unit 132 is connected to prefix tree 100 and the generating unit 130. The calculating unit 132 receives one or more new hypotheses. The calculating unit 132 calculates a score of each new hypothesis by using the prefix tree. In this calculation, the generating unit 130 adds the bonus score assigned by the assigning unit 120 to the score (i.e., the base score) for the new hypothesis in response to that the new hypothesis includes the first transition with the bonus score. The calculating unit 132 also cancels the bonus score assigned by the canceling unit 125 from the base score of the new hypothesis in response to the new hypothesis, which includes the second transition that is not included in the at least one transition representing the new word. In various embodiments, the calculating unit 132 cancels the bonus score by adding the negative bonus score assigned by the canceling unit 125 to the base score. In other words, the calculating unit 132 subtracts the bonus score from the base score.

The determining unit 135 is connected to the calculating unit 132. The determining unit 135 receives one or more new hypotheses and the score of each new hypothesis. The determining unit 135 determines, based on the score of each new hypothesis, whether to keep the new hypothesis as a candidate of at least a part of a recognized text. The determining unit 135 updates the set of hypotheses stored in the hypotheses 140 by storing new hypotheses determined to be kept. After generating one or more hypotheses for the entire speech sequence, the determining unit 135 outputs the hypothesis having the highest score as the text sequence.

The hypotheses 140 is connected to the determining unit 135. The determining unit 135 stores a set of hypotheses in the hypotheses 140. In various embodiments, the determining unit 135 stores a predetermined number of hypotheses (e.g., 10) having the highest scores in the hypotheses 140.

The speech recognition apparatus 10 may further include at least one of an adjusting unit 150 or a training unit 155. The adjusting unit 150 is connected to the determining unit 135 and receives the text sequence transformed from the speech sequence. The adjusting unit 150 also receives training data. The training data is a predetermined or supervised learning set of text sequences that correspond to a speech sequence. In one implementation, the training data is the text sequence output from the determining unit 135 and corrected by using a user interface for displaying the text sequence and inputting corrections from a user of the speech recognition apparatus 10. The adjusting unit 150 adjusts the bonus score in the prefix tree based on the correctness of the new word in the recognized text.

The training unit 155 is connected to the determining unit 135 and receives the text sequence transformed from the speech sequence. The adjusting unit 150 also receives the training data. The training unit 155 retrains the transducer in the generating unit 130 by using one or more sets of the speech sequence from the determining unit 135 and the training data to improve the correctness of transformation. After retraining, the training unit 155 may or may not reset the bonus scores stored in the prefix tree.

In various embodiments, the speech recognition apparatus 10 can assign a bonus score to a transition relating to a specific word in the prefix tree. This bonus score is reflected to a score of a hypothesis including such transition. By doing so, the speech recognition apparatus 10 can increase the probability of selecting or keeping the hypothesis. Therefore, the speech recognition apparatus 10 can increase the probability of using the word in the recognized text. This is useful when the prefix tree includes a rarely used word or the speech recognition model in the generating unit 130 is not sufficiently trained to use the word.

The speech recognition apparatus 10 may also cancel the bonus score if the hypothesis is determined to include a second transition following the first transition and the second transition is not included in the path representing the new word. Therefore, the speech recognition apparatus 10 can assign a bonus score to a transition that can be shared by other vocabulary words. By canceling the bonus score, the speech recognition apparatus 10 can finally select the hypothesis based on the base score without using the bonus score if the hypothesis does not include the new word.

The speech recognition apparatus 10 may also add a new word to the prefix tree and assign a bonus score to a transition relating to the new word. Therefore, the generating unit 130 in the speech recognition apparatus 10 can continue generating hypotheses by the transducer that is not retrained to use the new word. In other words, the generating unit 130 can continue generating hypotheses by the transducer that is not retrained to increase the probability of generating the new word after adding the path of the at least one transition of the new word in the prefix tree.

Figure 2:
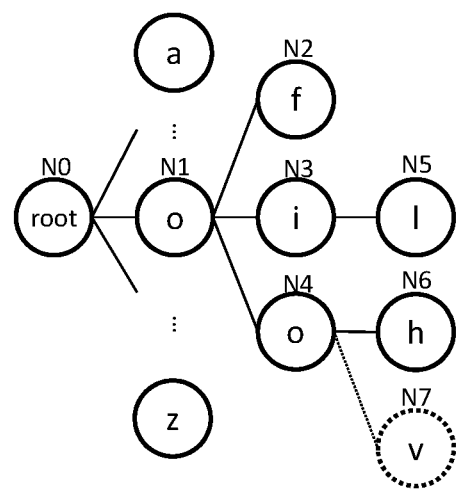
FIG. 2 shows an example of a prefix tree according to an embodiment of the present invention.

FIG. 2 shows an example of the prefix tree 100 according to an embodiment of the present invention. The prefix tree includes a plurality of nodes including nodes N0 to N7. Node N0 is a root node. The other nodes represent a symbol or an element (e.g., a character or a sub-word of a vocabulary word). A node representing the last symbol of a vocabulary word becomes a leaf node.

In prefix tree 100, one or more nodes that represent one or more symbols of a word are connected by one or more links in the order that appeared in the word. The first character or symbol is connected to the root node NO. For example, the vocabulary word "oil" has three symbols "o," "i," and "l," and node N1 represents "o," node N3 represents "i," and node N5 represents "l." Nodes N1, N3, and N5 are connected in the order N1 ("o")—N3 ("i")—N5 ("l"), which is the same order that appeared in the vocabulary word "oil." The front node N1 is connected to the root node NO. The links between nodes are also referred to as transitions, paths, or edges. The path of transitions N0-N1-N3-N5 represents the word "oil."

If two or more vocabulary words have the same front part (i.e., share the first few letters), the nodes representing the front part are shared in the tree data structure. For example, vocabulary words "of," "oil," and "ooh" share node N1 ("o"). In case the adding unit 115 adds a new word "oov" (an abbreviation of "out of vocabulary") in the prefix tree, the adding unit 115 connects node N7 ("v") to node N4 ("o") because the prefix tree already includes a path of transitions N0 (root)-N1 ("o")-N4 ("o").

Figure 3:
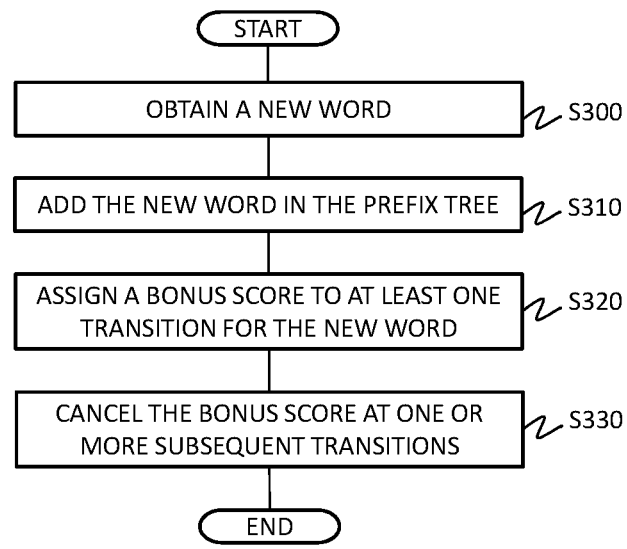
FIG. 3 shows a flowchart for adding a new word to the prefix tree according to an embodiment of the present invention.

FIG. 3 shows a flowchart for adding a new word to the prefix tree according to an embodiment of the present invention. The operations of FIG. 3 can be performed by, for example, the speech recognition apparatus 10 and its components that were explained in reference to FIG. 1. While the operational flow of FIG. 3 will be explained in reference to the speech recognition apparatus 10 and its components, the operational flow can be performed by other apparatuses having different components as well.

At Step 300 (S300), the obtaining unit 110 obtains a new word as a new word that is not included in prefix tree 100. For example, when "oov" is not included in the prefix tree (i.e., the prefix tree does not include node N7), the obtaining unit 110 may obtain the word "oov" as a new word.

At S310, the adding unit 115 adds the new word to the prefix tree. For example, the adding unit 115 adds a path of transitions N0 (root)-N1 ("o")-N4 ("o")-N7 ("v") representing the word "oov" in the prefix tree. Since the prefix tree already includes a path of transitions N0 (root)-N1 ("o")-N4 ("o"), the adding unit 115 reuses nodes N1 and N4 and adds node N7 connected to node N4.

At S320, the assigning unit 120 assigns a bonus score to one or more transitions included in the path representing the new word. At S330, the canceling unit 125 cancels the bonus score at one or more subsequent transitions by assigning a negative bonus score to a subsequent transition in prefix tree 100. In some embodiments, S330 is optional and speech recognition apparatus 10 may not perform S330.

FIG. 4A shows a first example of assigning the bonus score in the prefix tree according to an embodiment of the present invention. In this example, the assigning unit 120 assigns the bonus score to a first transition from a first node to a second node in a prefix tree. Here, the first node is a leaf node representing "v" (node N7 in FIG. 2) in the prefix tree and the second node is a root node (node NO) in the prefix tree.

FIG. 4B shows a second example of assigning the bonus score in the prefix tree according to an embodiment of the present invention. In this example, the assigning unit 120 assigns the bonus score to a first transition from a first node to a second node in a prefix tree. In this example, the second node is a leaf node representing "v" (node N7 in FIG. 2) in the prefix tree, and the first node is a previous node of the leaf node in the path representing "o."

In the examples of FIGS. 4A and 4B, the bonus score is assigned to a transition that only appears in the new word. Therefore, the speech recognition apparatus 10 does not need to cancel the bonus score.

FIG. 4C shows a third example of assigning and canceling the bonus score in the prefix tree according to an embodiment of the present invention. In this example, the assigning unit 120 assigns the bonus score to a first transition from a first node to a second node in a prefix tree. Here, the first transition appears early in the new word and is shared by other vocabulary words represented by prefix tree 100. In this example, the bonus score is assigned to the transition from the root node.

In various embodiments, the canceling unit 125 cancels the bonus score at a second transition that is not included in the at least one transition representing the new word by assigning a negative bonus score to the second transition, which is located downstream of the first transition. Then the calculating unit 125 can cancel the bonus score in response to the hypothesis further determined to include the second transition.

In this example, the assigning unit 120 assigns a bonus score to a first transition from the first node (root node NO) to the second node (node N1) in the path representing the word "oov" (CASE 4). The first transition is also included in the path representing other vocabulary words "of," "oil," and "ooh." Therefore, the canceling unit 125 cancels the bonus score at a second transition, which is located downstream of the first transition in the prefix tree, if the second transition is not included in the transitions representing the new word.

In this example, the transitions from the second node (node N1 representing "o") to node N2 ("f," CASE 1) and node N3 ("i," CASE 2), and the transition from node N3 ("o") to node N4 ("h," CASE 3) are not included in the path of transitions representing the new word. The canceling unit 125 cancels the bonus score by assigning a negative bonus score to these second transitions. By assigning the bonus score in the earlier transition for the new word, the speech recognition apparatus 10 can increase the probability of keeping hypotheses that include the first transition.

FIG. 4D shows a fourth example of assigning and canceling a bonus score in prefix tree 100 according to an embodiment of the present invention. In this example, the assigning unit 120 may assign a bonus score to two or more transitions included in a path representing the new word. As shown in CASE 3 and 4, the assigning unit 120 assigns a bonus score to a first transition from a first node (root node N0 in FIG. 4D) to a second node (node N1 representing "o"). Further, the assigning unit 120 assigns a bonus score to a third transition from the second node to a third node (node N4 representing "o") on a condition that the third transition is included in the path of the at least one transition representing the new word. The assigning unit 120 may assign a bonus score to each transition (may or may not include the transition from the leaf node) included in the path of transitions representing the new word (CASE 4).

The canceling unit 125 cancels each bonus score in response to the hypothesis further determined to include a second transition that is not included in the at least one transition representing the new word. If the bonus score is assigned to the first transition and the third transition, the canceling unit 125 cancels the bonus score of the first transition and the bonus score of the third transition.

In this example, the transitions from the second node (node N1 representing "o") to node N2 ("f," CASE 1) and node N3 ("i," CASE 2), and the transition from node N3 ("o") to node N4 ("h," CASE 3) are not included in the path of transitions representing the new word. In CASE 1 and 2, the canceling unit 125 assigns a negative bonus score to the second transition that is not included in the path representing the new word. In CASE 3, since the bonus score is assigned to two transitions, the canceling unit 125 assigns a "−2" negative bonus score to the second transition.

In the examples of FIGS. 4C and 4D, the speech recognition apparatus 10 can assign a bonus score to a transition that may also appear in other vocabulary words. Then, the speech recognition apparatus 10 can assign the bonus score to earlier transitions of the new word. Therefore, the speech recognition apparatus 10 can decrease the probability of discarding a hypothesis before adding the entire first word to the hypothesis.

Figure 5:
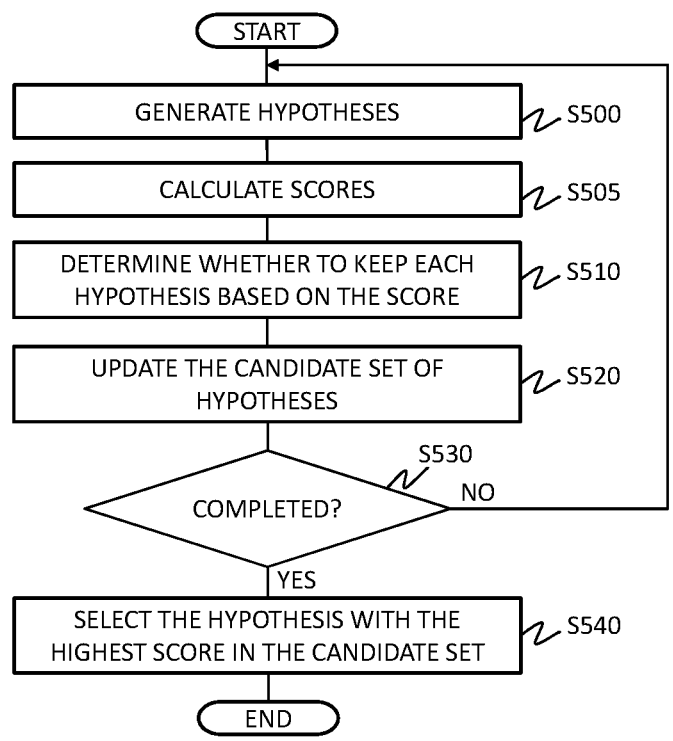
FIG. 5 shows a flowchart for recognizing a speech according to an embodiment of the present invention.

FIG. 5 shows a flowchart for recognizing a speech according to an embodiment of the present invention. The operations of FIG. 5 can be performed by, for example, the speech recognition apparatus 10 and its components that are explained in reference to FIG. 1. While the operational flow of FIG. 5 will be explained in reference to the speech recognition apparatus 10 and its components, the operational flow can be performed by other apparatuses having different components as well.

Before starting the operations of this flowchart, the speech recognition apparatus 10 initializes the set of hypotheses stored in the hypotheses 140. The speech recognition apparatus 10 starts transforming the speech sequence from the beginning.

At S500, the generating unit 130 generates one or more hypotheses based on the set of hypotheses 140. In various embodiments, an RNN transducer in the generating unit 130 calculates, for each current hypothesis stored in the hypotheses 140, a transducer score of each symbol (e.g., "a," "b," "c," . . . , "o," . . . ) to be added to the hypothesis. To generate the hypothesis that includes words only from the vocabulary words, the generating unit 130 selects the next symbol from the next node in the prefix tree. After calculating transducer scores, the generating unit 130 generates one or more new hypotheses from each current hypothesis by adding each selected symbol to the current hypothesis.

For example, suppose the hypotheses 140 stores hypotheses X, Y, and Z. The generating unit 130 calculates a transducer score of each next symbol "a," "b," "c," . . . to be added to hypothesis X. The generating unit 130 also calculates a transducer score of each next symbol "a," "b," "c," . . . to be added to hypothesis Y. The generating unit 130 also calculates a transducer score of each next symbol "a," "b," "c," . . . to be added to hypothesis Z. In this calculation, the next symbol is limited to a symbol that is linked from the last node of the corresponding hypothesis in the prefix tree. Then, the generating unit 130 generates new hypotheses X+"a," X+"b," X+"c," . . . , Y+"a," Y+"b," Y+"c,", . . . , Z+"a," Z+"b," Z+"c."

In an implementation, the RNN transducer includes an encoder, a prediction network, and a joint network. The encoder sequentially receives the input vectors of the speech sequence (in forward and backward directions in some implementation), and the encoder outputs vectors. The prediction network inputs a symbol in the current hypothesis and outputs a vector. The joint network inputs both outputs of the encoder and the prediction network, and outputs the transducer score of each symbol given current hypothesis and speech. Instead of using an RNN transducer, the generating unit 130 may use a transducer that calculates transducer scores by using different calculations.

At S505, the calculating unit 132 calculates a score of each hypothesis by using the prefix tree. In various embodiments, the calculating unit 132 adds the score of the current hypothesis and the transducer score of the next symbol to obtain the base score of the corresponding new hypothesis. The calculating unit 132 also adds the bonus score to the base score of the new hypothesis in response to the transition from the current hypothesis to the next symbol having the bonus score in the prefix tree.

For example, if the current hypothesis X has an initial hypothesis score 10.0 and the transducer score of the next symbol "o" to be added to the current hypothesis X has a score 1.0, the base score of the new hypothesis X+"o" will be 11.0. If a bonus score of 0.7 is assigned to a transition from the last symbol of the current hypothesis X to "o" (e.g., a transition from the root node N0 to the node N1 in CASE 3 of FIG. 4C), the calculating unit 132 adds the bonus score 0.7 to the base score 11.0 to obtain the score 11.7 of the new hypothesis X+"o."

The calculating unit 132 subtracts the bonus score from the base score of the new hypothesis in response to the transition from the current hypothesis to the next symbol with the negative bonus score in the prefix tree. For example, if the current hypothesis Y has a score 12.0 and the transducer score of the next symbol "h" to be added to the current hypothesis Y has a score 0.5, then the base score of the new hypothesis Y+"h" will be 12.5. If a negative bonus score of −0.7 is assigned to a transition from the last symbol of the current hypothesis Y to "h" (e.g., a transition from the node N4 to the node N6 in CASE 3 of FIG. 4C), the calculating unit 132 subtracts the bonus score 0.7 from the base score 12.5 to obtain the score 11.8 of the new hypothesis Y+"h."

At S510, the determining unit 135 determines, based on the score of each hypothesis, whether to keep the hypothesis as a candidate of at least a part of a recognized text. In some embodiments, the hypotheses 140 stores a predetermined number of hypotheses. Since the generating unit 130 tends to generate two or more hypotheses from each hypothesis stored in the hypotheses 140, the determining unit 135 determines to discard some hypotheses. Therefore, the determining unit 135 selects the predetermined number of hypotheses with the highest scores.

At S520, the determining unit 135 updates the set of hypotheses stored in the hypotheses 140 based on the score of each hypothesis generated by a transducer. The determining unit 135 may limit the number of hypotheses stored in the hypotheses 140 to a predetermined number. At S530, the speech recognition apparatus 10 repeats S500 to S520 until transforming the entire speech sequence.

At S540, the predetermined number of hypotheses are finally obtained in the hypotheses 140 after transforming the entire speech sequence. The determining unit 135 selects the recognized text from the hypotheses finally obtained in the hypotheses 140. In various embodiments, the determining unit 135 selects the hypothesis having the highest score and outputs the selected hypothesis as the text sequence.

FIG. 6 shows an algorithm comprising pseudo-code for recognizing speech according to an embodiment of the present invention. The algorithm of FIG. 6 is an illustrative implementation of the operations shown in FIG. 5 with some modifications.

At line #01, the speech recognition apparatus 10 initializes the set of hypotheses stored in the hypotheses 140. In this algorithm, each hypothesis with its score is named "a beam." The hypotheses 140 stores N beam. The speech recognition apparatus 10 initializes each hypothesis to null and a score of each hypothesis to 0. The speech recognition apparatus 10 repeats lines #02 to #11 for time t from the beginning to the end of the speech sequence.

The speech recognition apparatus 10 repeats lines #04 to #10 for each beam b. At line #04, the generating unit 130 obtains the transducer scores at time t for each beam b. Line #04 corresponds to the calculation of the transducer score of each symbol at S500 in FIG. 5.

The speech recognition apparatus 10 performs lines #07 to #09 for each possible next character (next symbol) c. The generating unit 130 selects the possible next characters in the prefix tree by finding nodes that can be transitioned from the node corresponding to the last character of the hypothesis of beam b.

At line #07, the generating unit 130 appends the character c to the hypothesis of beam b to generate the new hypothesis. This step corresponds to the generation of the new hypothesis at S500 in FIG. 5. At line #08, the calculating unit 132 adds the transducer score of the character c to the score of the beam b to calculate the base score of beam b. This step corresponds to the calculation of the base score at S505 in FIG. 5.

At line #09, the calculating unit 132 adds or cancels the bonus score of the new beam. This step corresponds to the addition or cancelation of the bonus score at S505 in FIG. 5.

After repeating for each character c and each beam b, the speech recognition apparatus 10 obtains one or more hypotheses. At line #12, the determining unit 135 determines to keep N beams that include N hypotheses with the highest scores and updates the beams stored in the hypotheses 140. This step corresponds to S510 and S520 in FIG. 5.

After transforming the entire speech sequence, the determining unit 135 outputs the hypothesis with the highest score as the text sequence at line #14. In the algorithm of FIG. 6, the determining unit 135 returns the hypothesis to the caller of this subroutine. This step corresponds to S540 in FIG. 5.

Figure 7:
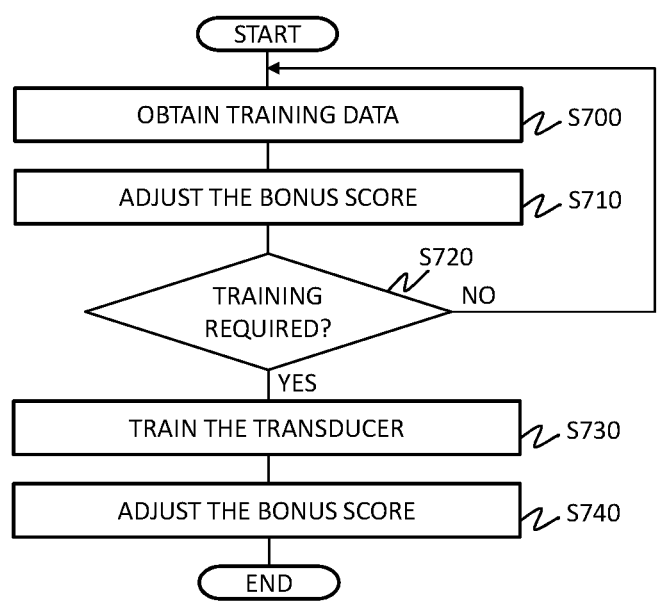
FIG. 7 shows a flowchart for adjusting a bonus score according to an embodiment of the present invention.

FIG. 7 shows a flowchart for adjusting a bonus score according to an embodiment of the present invention. The operations of FIG. 7 can be performed by, for example, the speech recognition apparatus 10 and its components that are explained in reference to FIG. 1. While the operational flow of FIG. 7 will be explained in reference to the speech recognition apparatus 10 and its components, the operational flow can be performed by other apparatuses having different components as well.

The speech recognition apparatus 10, in some embodiments, has an optional function of adjusting the bonus score in the prefix tree. At S700, the adjusting unit 150 obtains training data. In various embodiments, the training data is a set of corrected text sequences corrected by, for example, a user or another apparatus.

At S710, the adjusting unit 150 compares each corrected text sequence with the corresponding text sequence. The adjusting unit 150 adjusts the bonus score in the prefix tree based on the correctness of the new word in the text sequence. If the text sequence is corrected to include the new word at one location, the adjusting unit 150 may increase the bonus score of the new word in the prefix tree. If the new word in the text sequence is corrected to another word at another location, the adjusting unit 150 may decrease the bonus score of the new word in the prefix tree. The adjusting unit 150 also adjusts the negative bonus score in response to adjusting the bonus score.

At S720, the training unit 155 determines whether training of the transducer is required. The adjusting unit 150 may retrain the transducer in response to, for example, receiving a user request, a predetermined time has passed from the previous training, or the correctness of transformation is lower than a threshold. If training is not required, the training unit 155 proceeds to perform S700.

If training is required, the training unit 155 trains the transducer in the generating unit 130 by using the training data and the text sequences from the determining unit 135 at S730. At S740, the training unit 155 adjusts the bonus score in the prefix tree by removing or decreasing the bonus score if, for example, the new word appears more than predetermined times in the training data. In another embodiment, the training unit 155 may not adjust the bonus score even after the transducer is retrained.

In various embodiments, the adjusting unit 150 can adjust the bonus score to increase the correctness of transforming a speech sequence to a text sequence. The training unit 155 can remove or decrease the bonus score after the transducer is trained to generate the new word.

Various embodiments of the present invention may be described with reference to flowcharts and block diagrams whose blocks may represent (1) steps of processes in which operations are performed or (2) sections of apparatuses responsible for performing operations. Certain steps and sections may be implemented by dedicated circuitry, programmable circuitry supplied with computer-readable instructions stored on computer-readable media, and/or processors supplied with computer-readable instructions stored on computer-readable media. Dedicated circuitry may include digital and/or analog hardware circuits and may include integrated circuits (IC) and/or discrete circuits. Programmable circuitry may include reconfigurable hardware circuits comprising logical AND, OR, XOR, NAND, NOR, and other logical operations, flip-flops, registers, memory elements, etc., such as field-programmable gate arrays (FPGA), programmable logic arrays (PLA), etc.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or an external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 8:
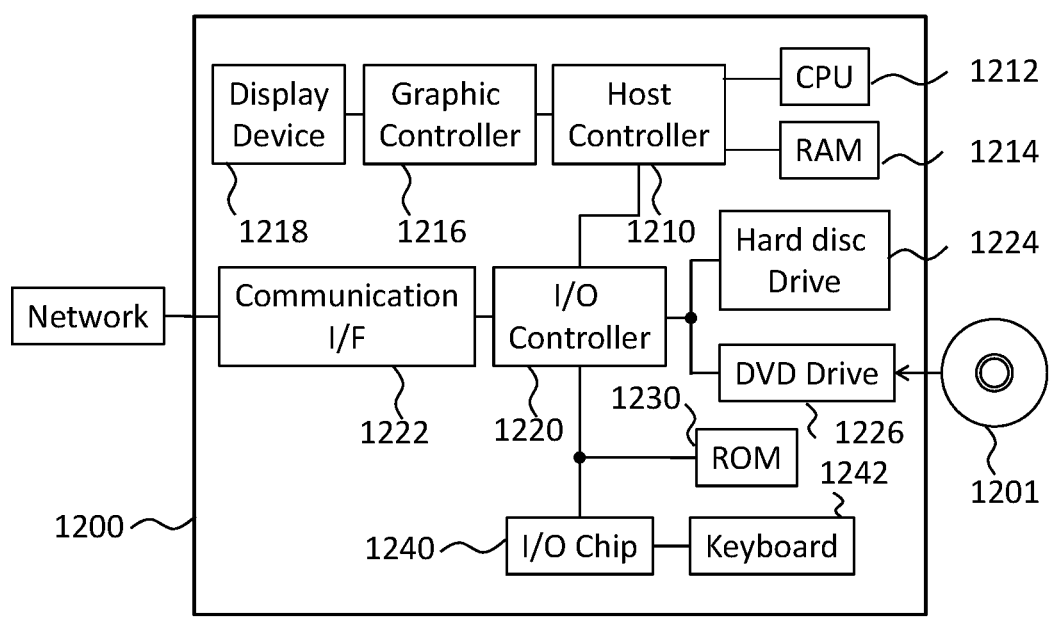
FIG. 8 shows an exemplary hardware configuration of a computer according to an embodiment of the present invention.

FIG. 8 shows an example of a computer 1200, in which aspects of the present invention may be wholly or partly embodied. A program that is installed in the computer 1200 can cause the computer 1200 to function as or perform operations associated with apparatuses of the embodiments of the present invention or one or more sections thereof, and/or cause the computer 1200 to perform processes of the embodiments of the present invention or steps thereof. Such a program may be executed by the CPU 1212 to cause the computer 1200 to perform certain operations associated with some or all of the blocks of flowcharts and block diagrams described herein.

The computer 1200 according to the present embodiment includes a CPU 1212, a RAM 1214, a graphics controller 1216, and a display device 1218, which are mutually connected by a host controller 1210. The computer 1200 also includes input/output units such as a communication interface 1222, a hard disk drive 1224, a DVD-ROM drive 1226 and an IC card drive, which are connected to the host controller 1210 via an input/output controller 1220. The computer also includes legacy input/output units such as a ROM 1230 and a keyboard 1242, which are connected to the input/output controller 1220 through an input/output chip 1240.

The CPU 1212 operates according to programs stored in the ROM 1230 and the RAM 1214, thereby controlling each unit. The graphics controller 1216 obtains image data generated by the CPU 1212 on a frame buffer or the like provided in the RAM 1214 or in itself, and causes the image data to be displayed on the display device 1218.

The communication interface 1222 communicates with other electronic devices via a network. The hard disk drive 1224 stores programs and data used by the CPU 1212 within the computer 1200. The DVD-ROM drive 1226 reads the programs or the data from the DVD-ROM 1201, and provides the hard disk drive 1224 with the programs or the data via the RAM 1214. The IC card drive reads programs and data from an IC card, and/or writes programs and data into the IC card.

The ROM 1230 stores therein a boot program or the like executed by the computer 1200 at the time of activation, and/or a program depending on the hardware of the computer 1200. The input/output chip 1240 may also connect various input/output units via a parallel port, a serial port, a keyboard port, a mouse port, and the like to the input/output controller 1220.

A program is provided by computer readable media such as the DVD-ROM 1201 or the IC card. The program is read from the computer readable media, installed into the hard disk drive 1224, RAM 1214, or ROM 1230, which are also examples of computer readable media, and executed by the CPU 1212. The information processing described in these programs is read into the computer 1200, resulting in cooperation between a program and the above-mentioned various types of hardware resources. An apparatus or method may be constituted by realizing the operation or processing of information in accordance with the usage of the computer 1200.

For example, when communication is performed between the computer 1200 and an external device, the CPU 1212 may execute a communication program loaded onto the RAM 1214 to instruct communication processing to the communication interface 1222, based on the processing described in the communication program. The communication interface 1222, under control of the CPU 1212, reads transmission data stored on a transmission buffering region provided in a recording medium such as the RAM 1214, the hard disk drive 1224, the DVD-ROM 1201, or the IC card, and transmits the read transmission data to a network or writes reception data received from a network to a reception buffering region or the like provided on the recording medium.

In addition, the CPU 1212 may cause all or a necessary portion of a file or a database to be read into the RAM 1214, the file or the database having been stored in an external recording medium such as the hard disk drive 1224, the DVD-ROM drive 1226 (DVD-ROM 1201), the IC card, etc., and perform various types of processing on the data on the RAM 1214. The CPU 1212 may then write back the processed data to the external recording medium.

Various types of information, such as various types of programs, data, tables, and databases, may be stored in the recording medium to undergo information processing. The CPU 1212 may perform various types of processing on the data read from the RAM 1214, which includes various types of operations, processing of information, condition judging, conditional branch, unconditional branch, search/replace of information, etc., as described throughout this disclosure and designated by an instruction sequence of programs, and writes the result back to the RAM 1214. In addition, the CPU 1212 may search for information in a file, a database, etc., in the recording medium. For example, when a plurality of entries, each having an attribute value of a first attribute associated with an attribute value of a second attribute, are stored in the recording medium, the CPU 1212 may search for an entry matching the condition whose attribute value of the first attribute is designated, from among the plurality of entries, and read the attribute value of the second attribute stored in the entry, thereby obtaining the attribute value of the second attribute associated with the first attribute satisfying the predetermined condition.

The above-explained program or software modules may be stored in the computer readable media on or near the computer 1200. In addition, a recording medium such as a hard disk or a RAM provided in a server system connected to a dedicated communication network or the Internet can be used as the computer readable media, thereby providing the program to the computer 1200 via the network.

While the embodiments of the present invention have been described, the technical scope of the invention is not limited to the above-described embodiments. It will be apparent to persons skilled in the art that various alterations and improvements can be added to the above-described embodiments. It should also apparent from the scope of the claims that the embodiments added with such alterations or improvements are within the technical scope of the invention.

Many of the embodiments of the present invention include artificial intelligence, and include neural networks in particular. Some of the foregoing embodiments describe specific types of neural networks. However, a neural network usually starts as a configuration of random values. Such untrained neural networks must be trained before they can be reasonably expected to perform a function with success. Once trained, a neural network may not require further training. In this way, a trained neural network is a product of the process of training an untrained neural network.

The operations, procedures, steps, and stages of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the process must be performed in this order.

What is claimed is:

1. A computer-implemented method for improving speech recognition, the computer-implemented method comprising:
receiving, by one or more processors, a new word to add to a prefix tree;
determining, by the one or more processors, a bonus score for a first transition from a first node to a second node in the prefix tree on condition that the first transition is included in a path of at least one transition representing the new word;
determining, by the one or more processors, a hypothesis score for a hypothesis that corresponds to a speech sequence based, at least in part, on the prefix tree, wherein the hypothesis score adds the bonus score to an initial hypothesis score to determine the hypothesis score; and
responsive to a determination that the hypothesis score exceeds a threshold value, generating, by the one or more processors, an output text sequence for the speech sequence based on the hypothesis.

2. The computer-implemented method of claim 1, wherein the hypothesis score is determined by a transducer that is not trained with the new word.

3. The computer-implemented method of claim 2, wherein the hypothesis score is further based on an adjustment on a correctness of the new word in the recognized text.

4. The computer-implemented method of claim 1, wherein the second node is a leaf node in the prefix tree.

5. The computer-implemented method of claim 1, further comprising:
cancelling, by the one or more processors, the bonus score in response to a determination that the hypothesis includes a second transition that is not included in the path of the at least one transition representing the new word.

6. The computer-implemented method of claim 1, wherein the determining a bonus score further comprises:
determining, by the one or more processors, a negative bonus score for a third transition from the second node to a third node in the prefix tree on a condition that the third transition is included in the path of the at least one transition.

7. The computer-implemented method of claim 6, further comprising:
cancelling, by the one or more processors, the bonus score of the first transition and the negative bonus score of the third transition in response to the hypothesis further determined to include a second transition that is not included in the path of the at least one transition representing the new word.

8. A computer program product for improving speech recognition, the computer program product comprising:
one or more computer-readable storage media and program instructions stored on the one or more computer-readable storage media, the program instructions comprising:
program instructions to receive a new word to add to a prefix tree;
program instructions to determine a bonus score for a first transition from a first node to a second node in the prefix tree on condition that the first transition is included in a path of at least one transition representing the new word;
program instructions to determine a hypothesis score for a hypothesis that corresponds to a speech sequence based, at least in part, on the prefix tree, wherein the hypothesis score adds the bonus score to an initial hypothesis score to determine the hypothesis score; and
responsive to a determination that the hypothesis score exceeds a threshold value, program instructions to generate an output text sequence for the speech sequence based on the hypothesis.

9. The computer program product of claim 8, wherein the hypothesis score is determined by a transducer that is not trained with the new word.

10. The computer program product of claim 9, wherein the hypothesis score is further based on an adjustment on a correctness of the new word in the recognized text.

11. The computer program product of claim 8, wherein the second node is a leaf node in the prefix tree.

12. The computer program product of claim 8, further comprising:
program instructions to cancel the bonus score in response to a determination that the hypothesis includes a second transition that is not included in the path of the at least one transition representing the new word.

13. The computer program product of claim 8, wherein the determining a bonus score further comprises:
program instructions to determine a negative bonus score for a third transition from the second node to a third node in the prefix tree on a condition that the third transition is included in the path of the at least one transition.

14. The computer program product of claim 13, further comprising:
program instructions to determine cancel the bonus score of the first transition and the negative bonus score of the third transition in response to the hypothesis further determined to include a second transition that is not included in the path of the at least one transition representing the new word.

15. A computer system for improving speech recognition, the computer system comprising:
one or more computer processors;
one or more computer readable storage media; and
program instructions stored on the computer readable storage media for execution by at least one of the one or more processors, the program instructions comprising:
program instructions to receive a new word to add to a prefix tree;
program instructions to determine a bonus score for a first transition from a first node to a second node in the prefix tree on condition that the first transition is included in a path of at least one transition representing the new word;
program instructions to determine a hypothesis score for a hypothesis that corresponds to a speech sequence based, at least in part, on the prefix tree, wherein the hypothesis score adds the bonus score to an initial hypothesis score to determine the hypothesis score; and
responsive to a determination that the hypothesis score exceeds a threshold value, program instructions to generate an output text sequence for the speech sequence based on the hypothesis.

16. The computer system of claim 15, wherein the hypothesis score is determined by a transducer that is not trained with the new word.

17. The computer system of claim 16, wherein the hypothesis score is further based on an adjustment on a correctness of the new word in the recognized text.

18. The computer system of claim 15, wherein the second node is a leaf node in the prefix tree.

19. The computer system of claim 15, further comprising:
program instructions to cancel the bonus score in response to a determination that the hypothesis includes a second transition that is not included in the path of the at least one transition representing the new word.

20. The computer system of claim 15, wherein the determining a bonus score further comprises:
program instructions to determine a negative bonus score to a third transition from the second node to a third node in the prefix tree on a condition that the third transition is included in the path of the at least one transition.

* * * * *